(12) United States Patent
Razazian et al.

(10) Patent No.: US 6,172,987 B1
(45) Date of Patent: Jan. 9, 2001

(54) SWITCHING COMPRESSION ROUTINES WITH NO LOSS OF DATA

(75) Inventors: Kaveh Razazian, Simi Valley; Xiao Ling Chang, Carmavillo; Lois Greer, Simi Valley, all of CA (US)

(73) Assignee: Nortel Networks Limited, Montreal (CA)

( * ) Notice: Under 35 U.S.C. 154(b), the term of this patent shall be extended for 0 days.

(21) Appl. No.: 09/190,389

(22) Filed: Nov. 10, 1998

(51) Int. Cl.$^7$ .................................. H04J 3/16; H04J 3/18
(52) U.S. Cl. ......................... 370/468; 370/477; 375/241
(58) Field of Search ...................... 370/477, 521, 370/465, 468, 433, 435; 375/240, 241, 377

(56) References Cited

U.S. PATENT DOCUMENTS

| | | | |
|---|---|---|---|
| 4,365,112 | * 12/1982 | Ruether et al. | 370/465 |
| 4,730,348 | * 3/1988 | MacCrisken | 375/240 |
| 5,182,762 | * 1/1993 | Shirai et al. | 375/240 |
| 5,245,614 | * 9/1993 | Gutman et al. | 370/477 |
| 5,452,289 | * 9/1995 | Sharma et al. | 370/477 |
| 5,499,240 | * 3/1996 | Gittins et al. | 370/477 |
| 5,623,491 | * 4/1997 | Skoog | 370/477 |
| 5,642,421 | * 6/1997 | Gray et al. | 380/49 |
| 5,666,350 | * 9/1997 | Huang et al. | 370/435 |
| 5,784,006 | * 7/1998 | Hochstein | 375/240 |
| 5,818,843 | * 10/1998 | Virdee et al. | 370/435 |
| 5,825,779 | * 10/1998 | Putnins et al. | 370/477 |
| 5,889,767 | * 3/1999 | Kimura | 370/314 |

* cited by examiner

Primary Examiner—Melvin Marcelo
Assistant Examiner—Phuongchau Ba Nguyen
(74) Attorney, Agent, or Firm—Blakely Sokoloff Taylor & Zafman LLP

(57) ABSTRACT

A method and apparatus to change compression methods without data loss. A real time system for converting compressing data using one of several compression methods is described. When a change in compression rates is requested, the system changes compression methods while continuing to compress data in real time without data loss.

19 Claims, 5 Drawing Sheets

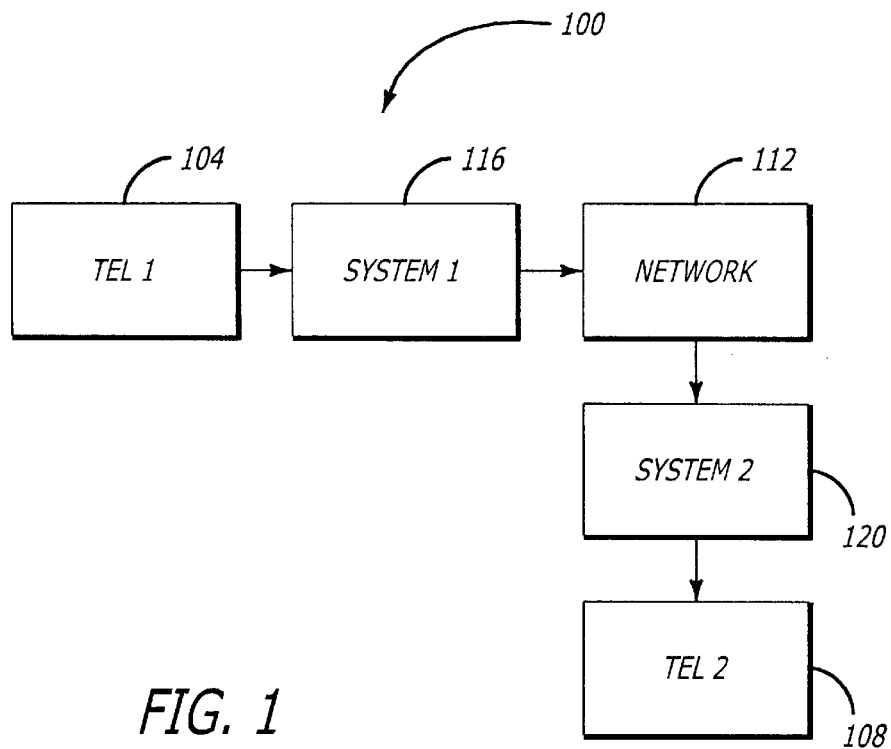
FIG. 1
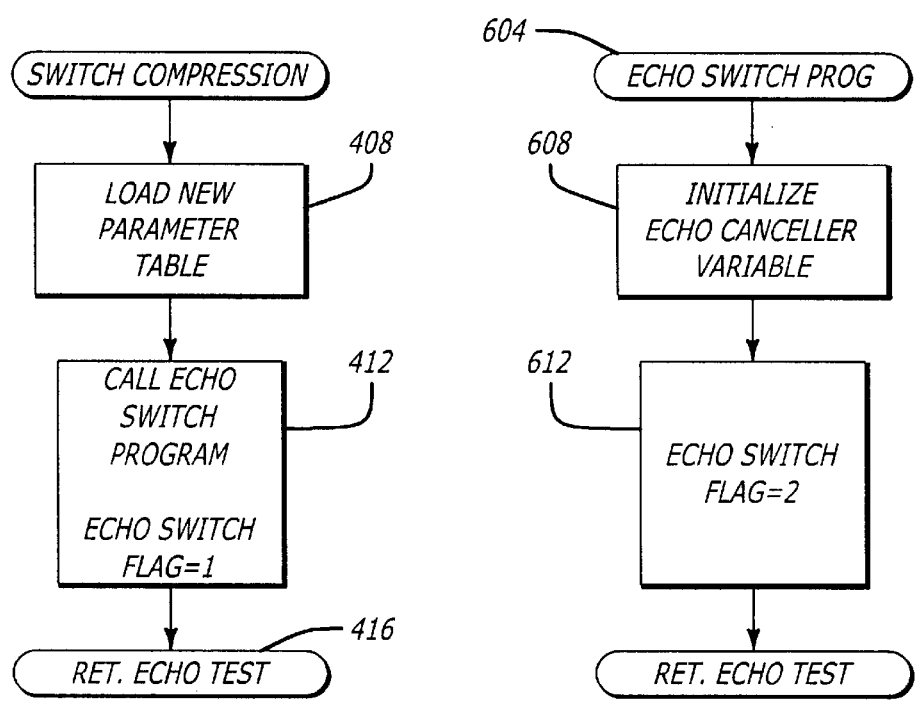
FIG. 4
FIG. 6

| SPEECH ALGORITHM TYPE | ALGORITHM DESCRIPTION | ALLOWED BIT RATES | RATE NUMBER |
|---|---|---|---|
| 0 | 1x64 BTDS | 64000 | N/A |
| 1 | 64kbps PCM | 64000 | N/A |
| 2 | g.729 | 8000 | NOT SUPPORTED IN RELEASE 1 |

FIG. 5

SWITCHING COMPRESSION ROUTINES WITH NO LOSS OF DATA

BACKGROUND OF THE INVENTION

1. Field of the Invention

The present invention relates to communication systems. More particularly, the invention relates to an apparatus and method for avoiding data loss during switching of data transfer protocols.

2. Description of Related Art

With the rise of the internet and other communication devices that couple to telephone networks, such as asynchronous transfer mode (ATM) networks, the amount of data transferred by these networks has been dramatically increasing. These networks have finite bandwidths. As data load increases, data congestion occurs. During periods of peak usage, when data congestion occurs, sources of data, such as telephones, and other digitized communication systems, reduce the data load by compressing the data or changing the rate of data transfer. The amount of compression may vary according to the needs of the network. High compression rates save bandwidth on the network, however, increases the processing time of the transmitting and receiving devices and may also result in deterioration of signal quality. Lower compression rates require less processing to reconstruct the signal and may allow for higher quality transmissions, however, during peak transmission times, the network may be unable to handle the high bandwidth requirements. Thus, many modern systems determine the network capability at a particular time and set a data transfer rate or compression routine used to compress data at the beginning of the transmission.

One problem with the current system is that during long transmissions, the network may change state during the transmission. In particular, the network may have a large increase in data load or may have a large decrease in data load. Thus, it is appropriate to change data transfer rates or compression routines in the middle of a transmission. Currently, modern systems switch the compression routine or the data transfer rate in the middle of a transmission through a process called "real time algorithm" or "real time rate switching."

One problem with real time algorithm or rate switching techniques is that during the rate switch, data is lost. Typically, a system transferring data includes buffers to accumulate data in frames for appropriate processing. For example, a G.726 processing system processes data in 80 byte frames while a Pulse Code Modulation (PCM) system processes data in 40 byte frames. A "G.726 processing system" is defined to be a processing system using the International Telecommunications Union (ITU, formerly CCITT, International Telegraph and Telephone Consultative Committee) G.726 standard for 40, 32, 24, 16 Kbit/second Adaptive Differential Pulse Code Modulation (ADPCM) established in Geneva, Switzerland, 1990. Hereinafter, the ITU G.726 standard will be referred to as "G.726". A PCM system is defined to be a system which uses the ITU standard G.711 set forth by the ITU (formerly CCITT) in Geneva, Switzerland, 1972. Hereinafter, the ITU G.711 standard will be referred to as "PCM". During a switch between compression routines, data stored in a buffer to accumulate a frame is typically discarded.

Discarding of the data in the buffer creates several problems. At a minimum, such data loss is inconvenient, causing an annoying, high-pitched noise unpleasant to human ears when the switch occurs. When data is being transferred, such as when a digital tone modulation frequency (DTMF) transmission is occurring, the data loss can result in digits or other vital information being lost.

Thus, a method and apparatus to handle such compression routine transitions or rate changes is needed which minimizes data loss.

SUMMARY OF THE INVENTION

A method and apparatus to prevent data loss during switching of compression routines is described. Typically, a system which transfers communications data from a source to a network compresses the data using one of several compression routines. The compression routine selected depends on the network load at a particular time. The compression routine selected may be changed in the middle of data transmission to accommodate changing network loads. In order to avoid losing data during a change of compression routines, a storage device buffers the communications data while a control circuit coordinates a change of compression routine to coincide with the output of a new frame of data from the storage device.

BRIEF DESCRIPTION OF THE DRAWINGS

The advantages of the present invention will become readily apparent to those ordinarily skilled in the art after reviewing the following detailed description and drawings wherein:

FIG. 1 is a system level diagram of a telephone coupled to a network.

FIG. 4 is a flow diagram illustrating a subroutine used by the echo task processing illustrated in FIG. 3.

FIG. 5 is an example of a parameter table.

FIG. 6 is a flow diagram illustrating an echo switch subroutine.

DETAILED DESCRIPTION

Figure 2:
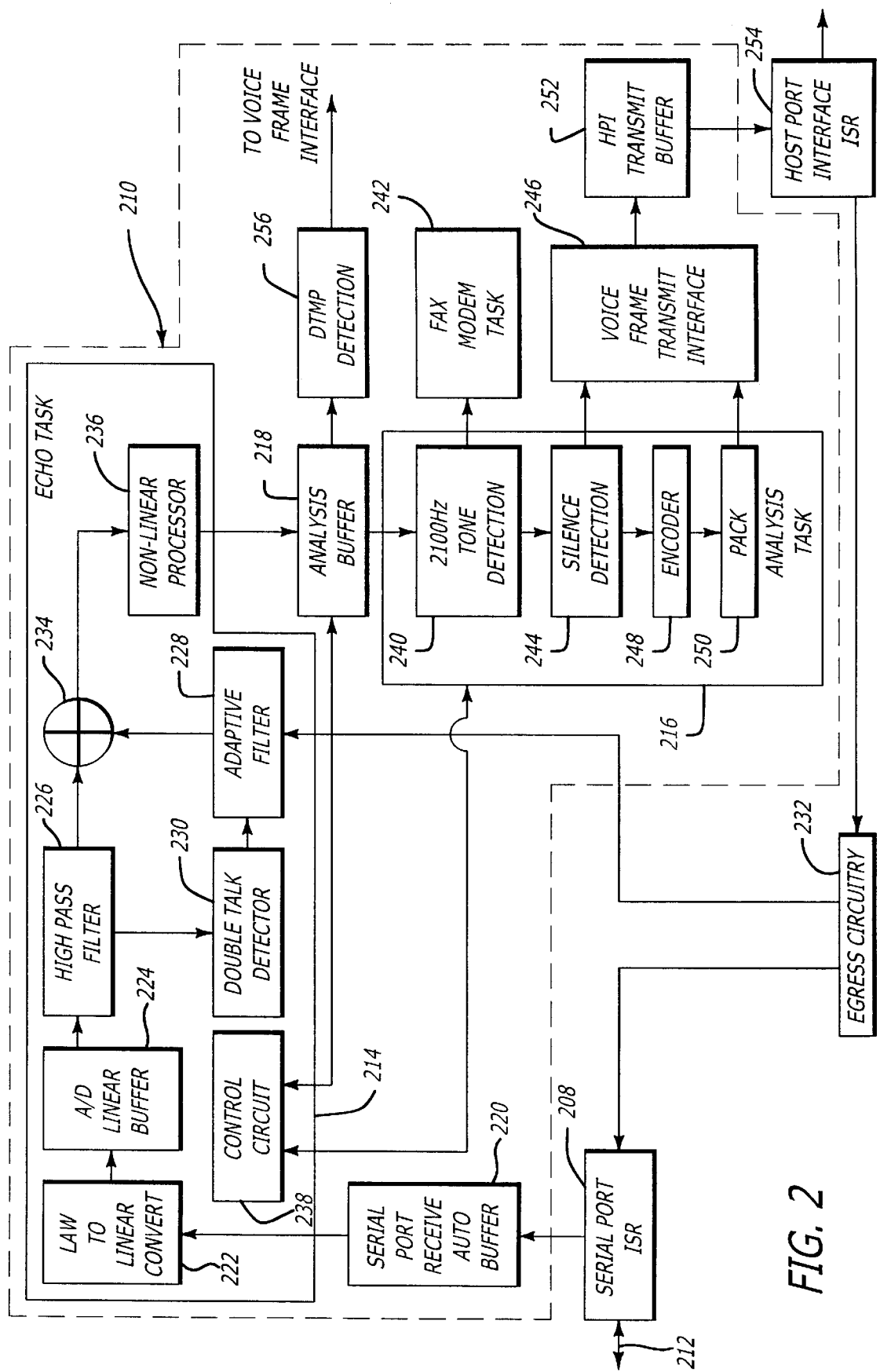
FIG. 2 illustrates a functional diagram of the system which receives data at a serial port from the source and transmits the data from a host port to the network.

The following detailed description describes a system to buffer data transferred from a source device, such as a telephone, to a network, such as an asynchronous transfer mode (ATM) link. The system prevents data loss by buffering incoming data until all data generated in an old compression routine has been processed before processing data using a new compression routine. By waiting until data in partial frames have been processed before switching to a new compression routine, the system avoids the loss of data which occurs from discarded partial frames.

In the following description, various embodiments of a system and method for executing lossless switching of compression routines will be described. The description will include details including the format and type of data being transmitted, the protocols used, the subroutines called, and the circuitry used to implement the system. However, such details are included to facilitate understanding of the invention and to describe alternate embodiments for implementing the invention. Such details should not be used to limit the invention to the particular embodiments described because other variations which would be obvious to one of ordinary skill in the art are possible while staying within the scope of the invention.

FIG. 1 illustrates a portion of an overall system 100 for transferring data between a first communications device (e.g., first telephone 104) and a second communications device (e.g., second telephone 108). The network 112 is typically a digital network which may contain switching equipment designed to transfer digital data. Typically the links within network 112 are asynchronous transfer mode (ATM) links carrying communication data from a wide variety of sources to a wide variety of receiving devices. The current invention focuses on systems 116, 120 which transfer the data from sources such as telephones 104, 108 to the network 112. Each system 116, 120 typically includes two data paths, an ingress route which transfers data from the source such as telephone 104 to the network 112 and an egress route which transfers data from network 112 to a receiving device which may also be a telephone 104. In one embodiment, data flows through system 116 in both directions, between telephone 104 and network 112. The current invention focuses on the ingress route, the transmission of data from the source such as telephone 104 to the network 112.

FIG. 2 illustrates a block diagram of an embodiment of system 116. Although FIG. 2 illustrates a hardware implementation of the invention, it is recognized that in an alternate embodiment, software may be used to implement the described invention. In the embodiment of the invention illustrated in FIG. 1, the source is a telephone. Serial port ISR 208 receives data in a variety of formats, including, but not limited to, speech data and digital signal through line 212. In one embodiment, a stream of data is received using a time division multiplexing (TDM) technique.

Serial port ISR 208 transfers the received telephone communication data from line 212 to an ingress route 210. When the stream of data is received, ingress route 210 may include circuitry to generate frames of data. For example, a circuit such as a digital signal processing (DSP) circuit may convert 5 msec samples of received data into a frame of PCM data or a 10 msec sample into a frame of G.726 data. The frames undergo processing including compression using one of several compression routines. When network 112 is an ATM network, header data may be added to each compressed frame to generate a corresponding ATM cell for output to an ATM network. Although the following description has described an ATM network, the invention may also be used for other network types such as IP networks.

Along ingress route 210, the received telephone data is processed to (1) remove echoes and (2) analyze and encode the data for transmission. Echo task circuit 214 performs removal of echoes while analysis task circuit 216 performs the processing and encoding of data. Analysis buffer 218 receives data from the output of echo task circuit 214. The output of analysis buffer 218 is input into analysis task circuit 216. The following detailed descriptions will describe one embodiment of echo task circuit 214, analysis task circuit 216 and analysis buffer 218.

Echo task circuit 214 is used to cancel line echoes (e.g., electrical echoes) which may result from non-perform hybrids (devices that couple local two-wire to long distance 4-wire circuits). Such echo canceling is important in teleconference systems where two or more parties are connected via full duplex links to alleviate acoustic feedback problems.

A serial port receive auto buffer 220 accumulates data from the telephone into samples appropriate for processing by echo task circuit 214. In one embodiment, auto buffer 220 stores 10-byte samples. The 10-byte samples are transmitted to echo task circuit 214 where a linear converter 222 converts the received digital data to linear data. Thus, in one embodiment of the invention, PCM data received in 18-bit segments is converted to a linear format. The output of the linear converter 222 is transferred to an analog to digital (A/D) linear buffer 224 which stores the data until high pass filter 226 is ready to receive data.

High pass filter 226, adaptive filter 228 and double-talk detector 230 collectively operate as echo cancellation circuitry to remove echoes by subtracting a filtered output from the microphone signal. Such a procedure is well known and described in detail in the *Electrical Engineering Handbook* by Richard C. Dorf, pages 401 to 403, published by IEEE, copyrighted 1993.

More specifically, high pass filter 226 of the echo cancellation circuitry remove DC offsets from the received signal. The output of high pass filter 226 is transmitted to a double-talk detector 230. Double-talk detector also receives signals from the egress circuit 232. When double-talk detector 230 detects duplicate signals or redundant data present in both egress circuit 232 and high pass filter 226, adaptive filter 228 uses a summing circuit 234 to subtract the redundant data from high pass filter 226 output to cancel the redundant data and remove the echo. Failure to cancel such echoes may result in acoustic feedback or "howling." Thus, echo task circuit 214 typically is always running and interactively processing incoming signals to cancel out echoes or feedback in the telephone signal. A non-linear processor 236 converts the output of summing circuit 234 into an appropriate digital format for analysis by analysis task circuit 216.

A control circuit 238 continuously monitors incoming signals and controls the flow of data through echo task circuit 214, analysis task circuit 216 and analysis buffer 218. Control circuit 238 may also maintain flags indicating when analysis buffer 218 is ready to transfer data, what compression routine is being used by analysis task circuit 216 and other related information. In one embodiment of control circuit 238, a processor executes a computer program to implement control functions of ingress route 210. The computer program may be hard wired using circuit elements, or may be implemented as computer code stored in a memory device. In the embodiment illustrated in FIG. 2, control circuit 238 is implemented in echo task circuit 214.

Analysis buffer 218 stores the data output by echo task circuit 214 until needed by analysis task circuit 216. Analysis buffer 218 is typically large, for example 256 bytes in one embodiment of the invention. Typically, the size of the analysis buffer will be greater than twice the largest frame size times the number of channels being transmitted. The analysis buffer 218 accumulates data and tracks frames to transfer to analysis task circuit 216. For example, when PCM protocol is used, the analysis buffer 218 may store the data and track when 40 bytes to form a frame of data have been received. Other protocols such as a G.726 protocol may cause analysis buffer 218 to store and track data until 80 bytes of data have been received to form a frame of G762 data.

An operating state machine or control circuit 238 controlling system 116 determines the protocol used to transmit data over network 112 of FIG. 1. Analysis task circuit 216 processes the received data according to the protocol selected for transmission by network 112 of FIG. 1. In one embodiment of ingress route 210, analysis buffer 218 transfers stored data to tone detection circuit 240 of analysis task circuit 216. Tone detection circuit 240 determines whether the signal received is a non-speech signal, for example, a fax signal in which the fax transmits a 2,100 hertz notification signal. When the tone detection circuit 240 detects an incoming non-speech or "particular data type," such as a fax signal, the tone detection circuit 240 may forward the particular data type to a processing circuit such as a fax/ modem task circuit 242. Fax/modem circuit 242 stores current voice digitizing and switches between compression/ encoding methods such as PCM encoding in order to make the highest possible data rate connection. When tone detection circuit 240 does not detect a particular data type, tone detection circuit 240 transfers the received data to a silence detection circuit 244 which detects silent periods. Silence detection circuit 244 transfers the silent packets to a voice frame transmit interface 246. The voice frame transmit interface receives both silence frames from silence detection circuit 244 as well as any special data types such as fax signals from fax/modem task circuit 242 and converts the data into appropriate form for transmission.

When the data received from analysis task circuit is speech data, encoder 248 encodes the speech data while pack circuit 250 packs the encoded speech data. Encoding the voice data in encoder circuit 248 and packing the data in pack circuit 250 produces a compressed signal, conforming to a particular protocol and posted into an ATM frame. A typical ATM frame includes a header having specific information that allows a receiving device to parse the data. A control system instructs encoder circuit 248 and pack circuit 250 to produce data conforming to a particular speech compression for transmission at a particular data rate. The speech compression or data rate selected is based on the needs of the transmitting or source device and the capabilities of network 112 of FIG. 1 which receives the data. The output of the processed voice data is transferred to a voice frame transmit interface 246 which prepares the data for transmission to an ATM link.

When voice frame transmit interface 246 has prepared the data in a format appropriate for transmission, the data is forwarded to transmit buffer 252 which stores the data. Transmit buffer 252 transfers data to the network through host port interface 254.

When a management circuit, such as a host at a remote end indicates rate switching is appropriate, prior art systems do not retain data in analysis buffer 218. In order to avoid data loss, one embodiment of the present invention causes control circuits in echo task circuit 214 to flag the beginning of the next frame of data in analysis buffer 218. The accumulation of data for the new compression routine continues while analysis task circuit 216 processes all data remaining prior to the flag in analysis buffer 218. By coordinating the start of a new compression routine with the start of a new frame, switching of routines while transmitting data in real time can be accomplished without data loss.

Analysis buffer 218 buffers data between the echo task circuit 214 and the analysis task circuit 216. In one embodiment, analysis task buffer 218 is a "circular buffer." In a circular buffer arrangement, analysis buffer 218 includes a pointer which counts up from a first number such a zero to a last number such as 255 before restarting the count from the first number such as zero. As data is received by analysis buffer 218, the looping of the pointer from zero to 255 coincides with the output of data to the analysis task circuit 216. A control circuit sets encoder 240 and pack circuit 250 to output data in a particular protocol. Analysis buffer 218 outputs data in frames to correspond to the protocol selected. For example the PCM protocol usually processes data in 40 byte frame segments while the G.726 protocol processes data in 80-byte frame segments.

When the compression routine is switched to generate a different protocol, analysis buffer 218 sets a flag to indicate protocol switching After the control circuit instructs a change in protocol, analysis buffer 218 uses a counter to count until the last byte of data in a frame is received from echo task circuit 214 and sets a flag to indicate the beginning of the next data frame. Control circuit 238 coordinates the switch over to the new protocol by analysis task circuit 216 to coincide with the start of the new frame of data in analysis buffer 218. The operation of a system to control analysis buffer 218 is described in flowcharts 3, 4, 6 and 7 which follows.

Figure 3:
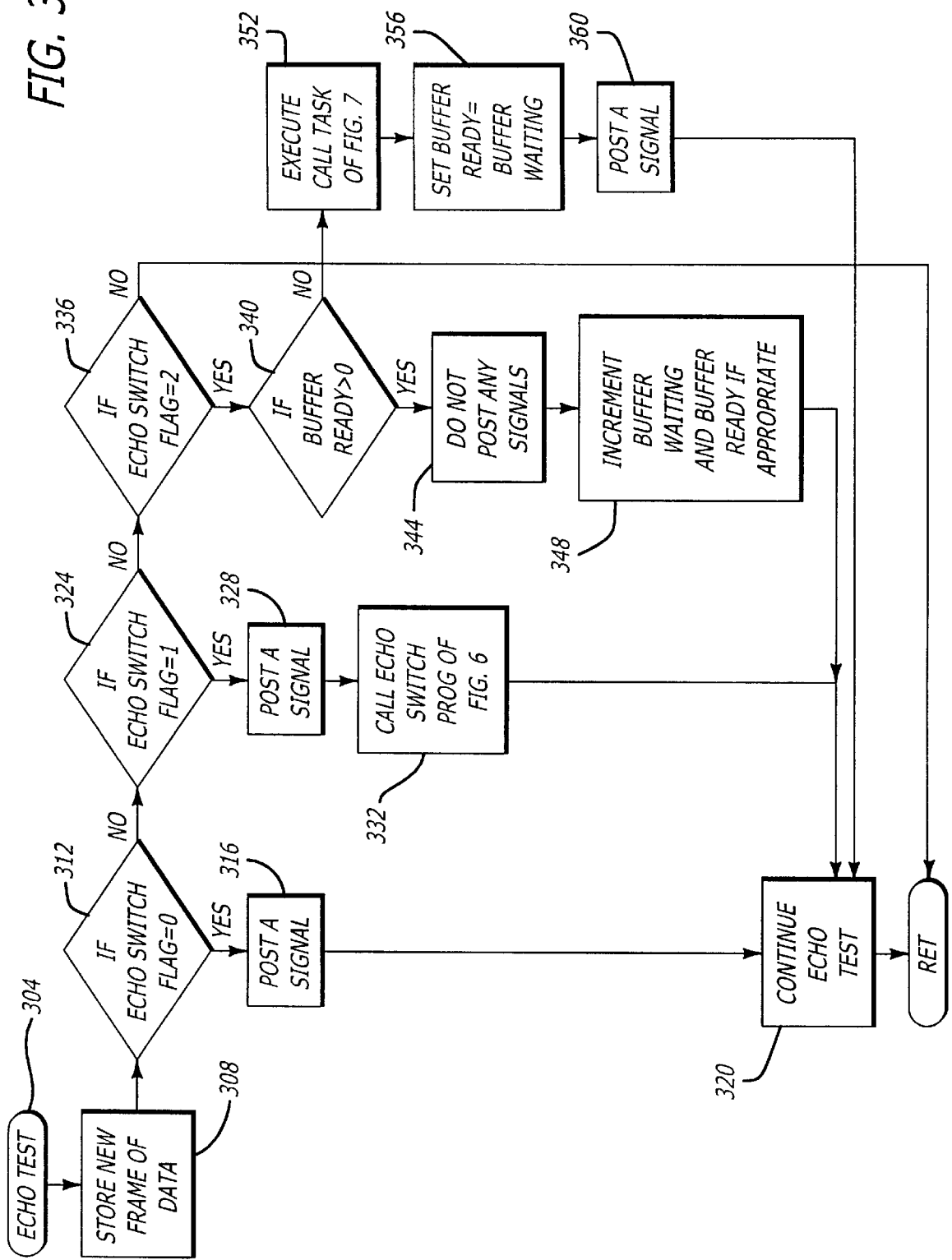
FIG. 3 is a flow diagram illustrating the processing of incoming data in one embodiment of the invention.

FIG. 3 is a flow diagram providing an illustrative embodiment of the overall system for controlling flag insertion while FIGS. 4–7 illustrate embodiments of subroutines used by the overall system of FIG. 3. In FIG. 3, an echo task continuously checks the echo task circuit in block 304 and stores frames of received data in block 308. The frames of data are stored in the analysis buffer 218 of FIG. 2. Under normal operation, when no change of protocol is occurring, an echo switch flag is maintained at a predetermined value such as zero. In block 312, when echo flag is determined to be zero, normal process routines occur and a signal is posted in block 316. As used in this patent, "posting a signal" is defined as posting of transferring data to an analysis task (ATASK). As long as operations are normal, "normal" meaning no change of protocols or data transfer rates, the echo task continues in block 320 to monitor for protocol or routine changes.

Control circuit 238 manages the system containing ingress route 210 of FIG. 2 to determine when a change in compression routines is needed. FIG. 4 illustrates the operation of the control circuit 238 to change the compression routine in one embodiment of the present invention. In FIG. 4, a new parameter table is loaded into the system in block 408. A parameter table typically includes data such as the compression routine description, allowed bit rates and possibly a rate number. Possible information transferred by a parameter table is illustrated in table 500 of FIG. 5. After the new parameter table is loaded and the change of compression routine is executed, an echo switch program is called in block 412. The operation of the echo switch program will be described in FIG. 6. The echo flag is set to 1 or a value different from the predetermined value and the system returns to the echo task 304 of FIG. 3.

In FIG. 3, during the next processing of decision block 312, it is determined that the echo switch flag is not set to zero. Instead, in block 324, when it is determined that the echo switch flag has been set to one, a control circuit in the echo test circuit causes the analysis task circuit to consume current data in the analysis buffer 218 using the former protocol by posting of signals in block 328. This continues until all data corresponding to a frame is consumed. Thus, data is transferred and a second subroutine or the echo switch subroutine is called in block 332. The echo switch subroutine is described in FIG. 6.

FIG. 6 shows the echo switch subroutine receiving the data in block 604. In block 608, the echo switch subroutine initializes the echo canceler variable for the echo task circuit 214 of FIG. 2 to correspond to the new protocol. Initializing the echo canceler variables may include setting a new buffer length corresponding to the new compression method used as well as setting pointers to the new functions which will be invoked by the new compression method. After changing the echo canceler variables in block 608, the echo switch flag is set equal to 2 in block 612 and the system returns to echo task block 308 of FIG. 3.

While the analysis task circuit continues processing of data using the old compression routine, the echo task monitors the echo switch flag. When the echo task determines that the echo switch flag is set to two in block 336, the echo task checks if the analysis task circuit has completed processing of data with the old compression routine.

Whether processing of data is complete is checked by monitoring a buffer ready flag in block 340. In one embodiment of the invention, the setting of the buffer ready flag is determined by whether the buffer pointer is pointing to the end of a frame containing old data to be processed using the old compression routine. When the buffer pointer is not pointing to the end of a frame, the buffer ready counter is greater than zero and the echo task does not invoke any functions to change the speech compression routine. Thus, to avoid interruption of the analysis task circuit, a signal is not posted (or a function is not invoked) in block 344 to allow analysis task circuit to complete processing of the remaining data using the old compression routine.

As echo task circuit 218 transmits new frames of data to the analysis buffer, buffer waiting counter is incremented, in block 348. The buffer waiting counter is used to track how many frames of new data to be processed by the new compression function is buffered in analysis buffer 218 of FIG. 2.

In blocks 336, 340, the echo task continues monitoring of the buffer ready flag. A buffer ready flag value greater than 0 indicates that the analysis circuit has completed processing of data using the old compression routine and is at a break point between frames. When buffer ready flag indicates that the analysis buffer is at the break point, echo task calls an analysis task subroutine in block 352. The analysis task subroutine is described in FIG. 7.

Figure 7:
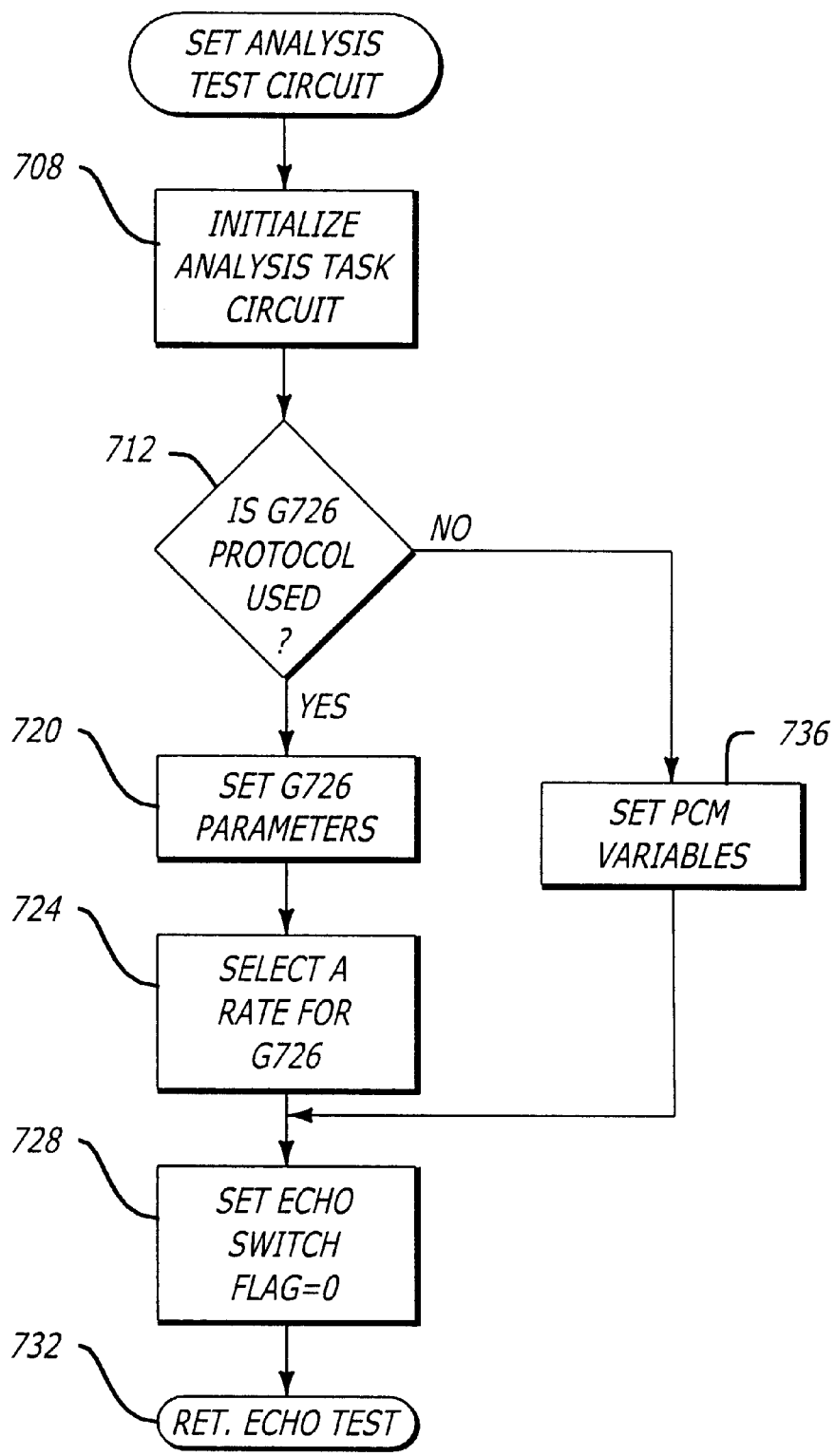
FIG. 7 is a flow diagram illustrating switching between a PCM and G.726 compression method.

In block 708 of FIG. 7, the analysis task subroutine initializes analysis task circuit 216 of FIG. 2 to handle the new speech compression routine. In block 712, when a G.726 compression routine is selected, the parameters for G.726 compression are set in block 720. The G.726 compression standard supports several different compression rates. In block 724, a compression rate is selected.

In the illustrated embodiment of FIG. 7, a PCM compression routine may also be selected. When a PCM compression function is selected, the appropriate PCM variables are set in block 736. In block 728, the echo switch flag is set to a value (e.g. 0) to indicate that the analysis task circuit is using the new compression function to process incoming data. In block 732, the system returns to the echo task processing routine of FIG. 3.

In block 356 of FIG. 3, the echo task checks the buffer waiting counter and notifies the analysis task circuit to process any new buffered frames of data accumulated during the switch in compression routines. The system returns to normal operation by posting a signal in block 360 and continuing the echo task in block 320.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A data compression apparatus comprising:
   a storage device to buffer uncompressed data;
   an analysis task circuit to receive uncompressed data from the storage device and to compress the uncompressed data, the analysis task circuit switchable between at least two compression routines used to compress the uncompressed data; and
   a control circuit to receive a request for a switch in compression routines while transmitting compressed data in real time, the control circuit to signal the analysis task circuit to switch compression routines when information corresponding to a beginning new frame of uncompressed data is output by the storage device.

2. The apparatus of claim 1 further comprising:
   an echo task circuit to remove echoes from a signal before input into the storage device.

3. The apparatus of claim 1 wherein the analysis task circuit includes a tone detection circuit to determine when the received uncompressed data is a fax transmission.

4. The apparatus of claim 1 wherein the analysis circuit switches between a G.726 compression routine and a PCM compression routine.

5. The apparatus of claim 2 wherein the apparatus further comprises a second buffer to temporarily store uncompressed data received from a serial port before transfer to the echo task circuit.

6. The apparatus of claim 2 wherein the control circuit signals the analysis task circuit to switch compression routines when a first byte of a new frame of uncompressed data is output by the storage device.

7. A data compression method comprising:
   compressing incoming uncompressed data using a first compression routine;
   receiving a signal requesting a change in compression routine while transmitting compressed data in real time;
   determining a beginning of a frame of uncompressed data in an analysis buffer; and switching compression routines as the beginning of the frame of uncompressed data is output to an encoder such that the compression of uncompressed data continues without data loss.

8. The method of claim 7 further comprising:
   receiving uncompressed data from the source device; and processing the uncompressed data from the source device to remove echoes before storing the uncompressed data in the analysis buffer.

9. The method of claim 8 wherein the processing of the uncompressed data removes duplicate data using an adaptive filter.

10. The method of claim 7 wherein the uncompressed data received is digitized audio data.

11. The method of claim 7 further comprising:
    packing the compressed data to ttheafter compressing the uncompressed data for transfer to the network.

12. The method of claim 7 wherein the compression routines include G.726 and PCM.

13. The method of claim 8 further comprising storing the uncompressed data in a serial port receive buffer before transfer to the echo task circuit.

14. A computer program product to manage a system compressing uncompressed data using one of a plurality of compression methods comprising:
    a first program section to instruct the system to flag a beginning of a frame of uncompressed data stored in an analysis buffer; and
    a second program section to instruct the system to change the compression method while transmitting compressed data in real time when the beginning of the frame of uncompressed data is output to an encoder circuit.

15. The computer program product of claim 14 wherein the computer program product is executed in an echo task circuit to manage a flow of uncompressed data from a telephone to an asynchronous transfer mode network.

16. The computer program of claim 14 wherein the first program section is executed when a host requests a change in the compression method.

17. The computer program of claim 14 wherein the compression method selected comprises one of G.726 and PCM.

18. A system for communicating to a data network comprising:
- a telephone to receive uncompressed voice data;
- an analog to digital converter to convert the uncompressed voice data to uncompressed digital voice data;
- an echo task circuit to remove echoes from the uncompressed digital voice data;
- an analysis buffer to temporarily store the output of the echo task circuit and identify a beginning of a frame after a change in encoding methods is requested;
- an analysis task circuit to compress the uncompressed digital voice data in a protocol using a compression method and output the compressed digital voice data to the data network; and
- a control circuit to synchronize a change in compression methods with the output of the beginning of the frame from the analysis buffer the change in compression methods being done while transmitting the compressed digital voice data in real time.

19. A data compression apparatus comprising:
- means for storing uncompressed data;
- means for compressing to receive the uncompressed data from the means for storing uncompressed data, the means for compressing switchable between at least two compression routines; and
- means for controlling to signal the means for compressing to switch compression routines when information corresponding to a beginning of a new frame of uncompressed data is output by the means for storing data, the change in compression methods being done while transmitting compressed data in real time.

* * * * *

UNITED STATES PATENT AND TRADEMARK OFFICE
CERTIFICATE OF CORRECTION

PATENT NO. : 6,172,987 B1
DATED : January 9, 2001
INVENTOR(S) : Razazian et al.

Page 1 of 2

It is certified that error appears in the above-identified patent and that said Letters Patent is hereby corrected as shown below:

Title page,
Inventors, Item [75], delete "Chang" and insert -- Zhang -- and delete "Carmavillo" and insert -- Camarillo --

Column 8, claim 1,
Line 5, delete: "while transmitting compressed data in real time, the control circuit to signal the analysis task circuit to switch compression routines when information corresponding to a beginning new frame of uncompressed data is output by the storage device."
And insert: -- while data is being compressed by the analysis task circuit, the control circuit to signal the analysis task circuit to switch compression routines concurrent with the analysis task circuit receiving a start of a new frame of data from the storage device. --

Column 8, claim 6,
Line 26, delete "a new frame" and insert -- the new frame --

Column 8, claim 7,
Line 29, delete 'compressing incoming uncompressed data using a first compression routine; receiving a signal requesting a change in compression routine while transmitting compressed data in real time; determining a beginning of a frame of uncompressed data in an analysis buffer; and switching compression routines as the beginning of the frame of uncompressed data is output to an encoder such that the compression of uncompressed data continues without data loss."
And insert: -- receiving incoming uncompressed data; generating frames of data from the incoming uncompressed data; compressing frames of data using a first compression routine; receiving a signal while compressing a first frame of data using the first compression routine, the signal requesting a change to compressing frames of data using a second compression routine; and switching to compressing frames of data using the second compression routine when compressing a second frame of data begins, the second frame of data immediately following the first frame of data such that the compression of uncompressed data continues without data loss. --

Claim 11,
Delete "tthe" and insert -- an asynchronous transfer mode frame --

Column 9, claim 18,
Line 16, after "digital voice data;" insert -- a temporary buffer to temporarily store the uncompressed digital voice data; --
Line 18, after 'digital voice data" insert -- received from the temporary buffer --

UNITED STATES PATENT AND TRADEMARK OFFICE
CERTIFICATE OF CORRECTION

PATENT NO.   : 6,172,987 B1
DATED        : January 9, 2001
INVENTOR(S)  : Razazian et al.

It is certified that error appears in the above-identified patent and that said Letters Patent is hereby corrected as shown below:

Column 10, claim 18,
Line 3, delete "a control circuit to synchronize a change in compression methods with the output of the beginning of the frame from the analysis buffer the change in compression methods being done while transmitting the compressed digital voice data in real time."
And insert -- a control circuit to synchronize a request for a change in compression methods received before the output of the beginning of the frame from the analysis buffer with the output of the beginning of the frame from the analysis buffer. --

Column 10, claim 19,
Line 16, delete "means for controlling to signal the means for compressing to switch compression routines when information corresponding to a beginning of a new frame of uncompressed data is output by the means for storing data, the change in compression methods being done while transmitting compressed data in real time."
And insert -- means for controlling to receive a request for a switch in compression routines while data is being compressed by the means for compressing and then to signal the means for compressing to switch compression routines concurrent with the means for compressing receiving a start of a new frame of data from the means for storing uncompressed data. --

Signed and Sealed this

Sixth Day of November, 2001

*Attest:*

NICHOLAS P. GODICI
*Attesting Officer*   Acting Director of the United States Patent and Trademark Office